United States Patent [19]

Bouille et al.

[11] 3,831,070
[45] Aug. 20, 1974

[54] IONIZATION SELF-PROTECTING CAPACITOR

[75] Inventors: Jean Bernard Bouille, Jumet; José Ledoyen, Mont-sur-Marchienne; Goerges Warmont, Monceau-sur-Sambre, all of Belgium

[73] Assignee: Ateliers De Constructions Electriques De Charleroi (ACEC), Charleroi, Belgium

[22] Filed: Mar. 7, 1973

[21] Appl. No.: 338,983

[30] Foreign Application Priority Data
Mar. 8, 1972   Belgium ................................. 3850

[52] U.S. Cl. .............. 317/260, 174/52 PE, 317/258
[51] Int. Cl. ............................................ H01g 1/02
[58] Field of Search .................... 317/260, 258, 242; 174/52 PE, 76

[56] References Cited
UNITED STATES PATENTS

| 2,503,912 | 4/1950 | Kimball | 317/260 |
| 2,674,646 | 4/1954 | Schoch | 317/242 X |
| 2,914,600 | 11/1959 | Smith | 174/52 PE |
| 3,225,708 | 6/1967 | Mankoff | 317/242 X |
| 3,439,233 | 4/1969 | Braiman | 317/260 X |
| 3,441,895 | 4/1969 | Schwartz | 174/52 PE |
| 3,484,536 | 12/1969 | Jaeschke | 174/52 PE |
| 3,504,132 | 3/1970 | Wallace | 174/52 PE |

FOREIGN PATENTS OR APPLICATIONS

| 1,490,086 | 6/1967 | France | 174/76 |
| 857,415 | 12/1960 | Great Britain | 317/242 |

OTHER PUBLICATIONS

Morgan Abstract of U.S. Pat. Ser. No. 515,343 filed 12–1943, published in O. G., Oct. 25 1949.

*Primary Examiner*—E. A. Goldberg
*Attorney, Agent, or Firm*—Bacon & Thomas

[57] ABSTRACT

Self-protecting capacitor against internal ionization, characterised in that it is coated with a gas-tight plastic material having a thickness such as to maintain constant the pressure due to the evolved gases arising from a damage of the capacitor dielectric material, caused by a start of ionization, and to avoid all contact of its active part with the atmosphere. The equilibrium pressure determines the end of the ionization.

6 Claims, 1 Drawing Figure

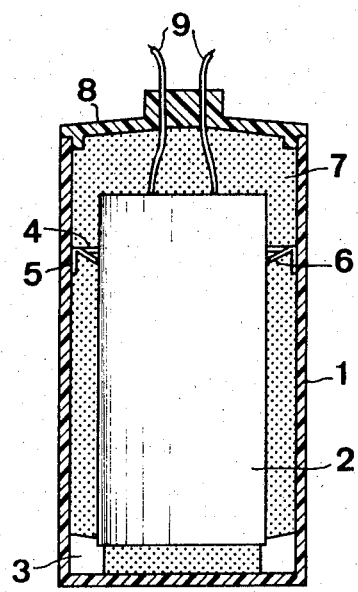

IONIZATION SELF-PROTECTING CAPACITOR

The present invention relates to a self-protecting capacitor against internal ionization arising from discharges that occur within the capacitor layers as a certain voltage is reached.

When the voltage applied across a capacitor reaches a certain value, discharges are known to occur therein, and particularly in capacitors constituted with two superimposed and coil-wound strips of a metallized plastic film, i.e., a film on which has been deposited by vacuum evoparation a thin layer of metal such as zinc or aluminum; these discharges produce a demetallization and sometime the damaging of the capacitors. This phenomenon is closely related to ionization encountered in solid and liquid insulators. The latter gives rise to a damage of the dielectric material whereby gases are evolved, the main gas being hydrogen. Also, the voltage starting from which the ionization is produced depends on the ambient pressure: the higher the pressure is, the lower are the chances to obtain discharges within the capacitor.

It is an object of the present invention to overcome the aforementioned drawbacks and to provide a capacitor in which the evolved gases coming from the undersirable ionization are used in order to produce a pressure which will stop the same ionization as soon as an equilibrium state is reached, thereby providing a self-protection for the capacitor.

According to the invention, a capacitor is coated with a gas-tight plastic material having a thickness such as to maintain at the same the pressure due to the evolved gases caused by a starting of ionization and to avoid all contact of the active part of the capacitor with the atmosphere.

The present invention will be explained more fully with reference to the enclosed FIGURE which represents a preferred embodiment of the invention.

The drawing is a cross-sectional view of a capacitor according to the invention.

The capacitor comprises a cylindrical housing 1, which may be made of plastic material, in which is contained a capacitor coil 2. The bottom of housing 1 is provided with ribs 3 which are used to maintain coil 2 at a certain level spaced from the housing bottom and to center it in order that it may be completely coated with plastic 7.

A further centering means is located within housing 1 and comprises a circular soft plastic ring 4 provided with an edge 5 and having small tongues 6 distributed along its inner periphery.

The coil 2 having been so centered within housing 1, the latter is filled with a plastic resin 7 which slowly polymerises and is gas-tight. Polyurethanes, epoxy resins and polyesters are preferably used, but any gas-tight resin is suitable.

The housing is closed by means of a cover 8 provided with two openings through which the connecting wires of the capacitor pass.

The coil can also be put into a mold in which a plastic material is poured or injected, which plastic, once hardened, constitutes itself the housing of the capacitor.

The capacitor according to the invention can hold higher voltages than those of the prior art; they can also withstand considerable overvoltages.

It is understood that the present invention is not limited to capacitors using a particular dielectric material nor to the above mentioned embodiment; the invention can further be used with coils subjected to mono or polyphased currents when contained in a single housing.

We claim:

1. In a capacitor structure having a wound capacitor in a cylindrical housing with a gas-tight plastic material between said capacitor and housing, the improvement comprising:

ribs in said housing, extending upwardly from the bottom thereof and configured to engage said capacitor and center the same in said housing spaced upwardly from the bottom thereof;

a soft plastic annular ring in said housing spaced upwardly from said ribs and having inwardly directed tongues distributed around its inner periphery and engaging and centering said capacitor in said housing;

said gas-tight plastic material completely surrounding said capacitor and being of sufficient thickness to withstand and contain internal pressures, caused by ionization in said capacitor, which contained pressure stops such ionization when an equilibrium state is reached, said capacitor structure being thereby self-protected against ionization damage.

2. A capacitor structure according to claim 1, wherein said plastic material is thermosetting.

3. A capacitor structure according to claim 1, wherein said plastic material is thermoplastic.

4. A capacitor structure according to claim 1, wherein said plastic material is a polyurethane.

5. A capacitor structure according to claim 1, wherein said plastic material is an epoxy resin.

6. A capacitor structure according to claim 1, wherein said plastic material is a polyester.

* * * * *